United States Patent
Ruutu et al.

(10) Patent No.: US 7,206,643 B2
(45) Date of Patent: Apr. 17, 2007

(54) APPARATUS, SYSTEM, AND METHOD FOR AUTOMATION USING AUTOMATION MODULES

(75) Inventors: Jussi Ruutu, Espoo (FI); Ville Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 296 days.

(21) Appl. No.: 10/732,835

(22) Filed: Dec. 10, 2003

(65) Prior Publication Data

US 2005/0131551 A1    Jun. 16, 2005

(51) Int. Cl.
G05B 19/18    (2006.01)
G05B 15/00    (2006.01)

(52) U.S. Cl. ............................. 700/9; 700/83
(58) Field of Classification Search .................. 700/9, 700/8, 13–16, 19, 65, 83, 149, 153, 275–278; 709/217–219; 340/310.11
See application file for complete search history.

(56) References Cited

U.S. PATENT DOCUMENTS

| | | | |
|---|---|---|---|
| 5,929,748 A * | 7/1999 | Odinak ................. 340/310.11 |
| 6,288,641 B1 | 9/2001 | Casais | |
| 6,330,337 B1 * | 12/2001 | Nicholson et al. ............ 381/86 |
| 6,349,352 B1 * | 2/2002 | Lea .............................. 710/72 |
| 6,356,192 B1 * | 3/2002 | Menard et al. ........ 340/539.19 |
| 6,694,349 B1 * | 2/2004 | Zou ............................ 709/202 |
| 6,874,037 B1 * | 3/2005 | Abram et al. ............... 709/248 |
| 6,963,784 B1 * | 11/2005 | Gibbs ........................... 700/94 |
| 2004/0260407 A1 * | 12/2004 | Wimsatt ....................... 700/19 |

OTHER PUBLICATIONS

Overview of UPnP AV Architecture: A Digital Media Technology Distribution for the Home; Research and Development at INTEL, Version 1.00, Jul. 2, 2003.

* cited by examiner

*Primary Examiner*—Thomas Pham
(74) *Attorney, Agent, or Firm*—Hollingsworth & Funk, LLC

(57) ABSTRACT

A system, apparatus and method for performing automation is disclosed. An apparatus configured to control an automation function includes one or more automation modules connectable into an assembly. The automation modules include a data interface for exchanging data with other automation modules and a processor coupled to the data interface. A functional component is operable by the processor for performing an independent automation task. The data interfaces of the automation modules are coupled to exchange data communications for coordinating the respective functional components of the automation modules to perform the automation function.

27 Claims, 6 Drawing Sheets

APPARATUS, SYSTEM, AND METHOD FOR AUTOMATION USING AUTOMATION MODULES

FIELD OF THE INVENTION

This invention relates in general to automation architectures, and more particularly to a method and apparatus for providing automation functions using automation modules.

BACKGROUND OF THE INVENTION

The use of automatic controls to manage electrical and mechanical devices has been adopted in some industries. Some automation tools have also migrated to consumer use, although adoption of home automation has been limited to hobbyists or those who can pay for custom installations. Typically, home automation systems include control devices that can automatically control electrical and/or mechanical devices. The control devices may also include sensors for detection, feedback, and/or reporting. A centralized control logic may be used to communicate with these devices, and users will typically make settings or adjustments at the control logic.

Current home automation systems provide many advantages once the systems are installed and configured correctly. The installation and configuration of these systems is not trivial, however. Even if the typical consumer could handle the physical installation of devices, the connection, troubleshooting, and control of the devices may require specialized tools and skills.

Although integrated home automation systems provide more flexibility than simple timers or other automatic controls, they still require a user to intervene when a situation changes. For example, an automatic lighting system may be set to turn out certain outside lights at sunset. An automated system can use a clock, calendar, and latitude data to turn the lights on precisely at sunset every day. However, if the user desires to change this routine for special occasions, the user must typically visit the controller logic and make the appropriate changes there.

It will be appreciated that automation systems will likely grow in capability and complexity. Therefore it is desirable to provide an easy way to install and control these automation systems, and control should be accessible at any time and wherever the user may be at the time.

SUMMARY OF THE INVENTION

A system, apparatus and method for performing automation is disclosed. In one embodiment of the present invention, an apparatus configured to control an automation function includes one or more automation modules connectable into an assembly. The automation modules include a data interface for exchanging data with other automation modules and a processor coupled to the data interface. A functional component is operable by the processor for performing an independent automation task. The data interfaces of the automation modules are coupled to exchange data communications for coordinating the respective functional components of the automation modules to perform the automation function.

In more particular embodiments of the invention, the data interfaces of the automation modules are accessible via a computing arrangement. The computing arrangement may actively control the automation function, and the computing arrangement may be configured to communicate instructions to the apparatus for coordinating the functional components. In one arrangement, the independent automation tasks of the automation modules include at least one of data input, control output, and external communications. In other configurations, the one or more automation modules may include a mechanical interface providing a physical attachment to other automation modules of the one or more automation modules.

In another embodiment of the present invention, a method for performing an automatic control function involves providing a first and second automation module. Each automation module is configured for performing an independent function. The first and second automation modules are connected into an assembly. The independent functions of the first and second automation modules are coordinated by communicating data between the first and second automation modules. The automatic control function is performed based on the coordinated independent functions of the first and second automation modules.

In another embodiment of the present invention, a system for controlling an automation function includes two or more control devices each formed from one or more automation modules connectable into an assembly. Each automation module includes a data interface for exchanging data with other automation modules of the one or more automation modules. A processor is coupled to the data interface and a functional component is operable by the processor for performing an independent automation task. The data interfaces of the one or more automation modules are coupled to exchange data communications for coordinating the respective functional components of the automation modules to perform a function of the control device. The control devices are configured to communicate with each other via the data interfaces of at least one of the automation modules for coordinating the independent functions of the control devices to perform the automation function.

In another embodiment of the present invention a computer-readable medium is configured with instructions for causing a processor of data processing arrangement to perform steps involving establishing communications with one or more automation modules connected into an assembly, the one or more automation modules being in data communication with each other, each automation module configured for performing an independent automation task; receiving data from the automation modules that describes the independent automation task associated with the automation modules; providing a user interface to create a data set used to coordinate the independent automation tasks of the automation modules to perform an automation function and communicating the data set to at least on of the automation modules to perform the automation function.

In another embodiment of the present invention an automation module operable with other automation modules for performing an automation function includes means for connecting with the other automation modules to form an automation assembly. The automation module also includes means for performing an independent automation task and means for exchanging data with other automation modules of the assembly to coordinate the independent automation task with one or more independent automation tasks of the other automation modules to perform the automation function.

BRIEF DESCRIPTION OF THE DRAWINGS

The invention is described in connection with the embodiments illustrated in the following diagrams.

DETAILED DESCRIPTION OF THE INVENTION

In the following description, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present disclosure describes a manner of building and controlling an automation system. One or more automation modules are interconnected to form a control system. The automation modules may perform independent tasks such as control/output, data input, and communication with devices outside the control system. The modules are designed to automatically inter-communicate, and through this inter-communication the modules can coordinate their respective tasks to perform automation functions. A computing arrangement may be coupled to the modules for providing some level of coordination between the modules.

Figure 1:
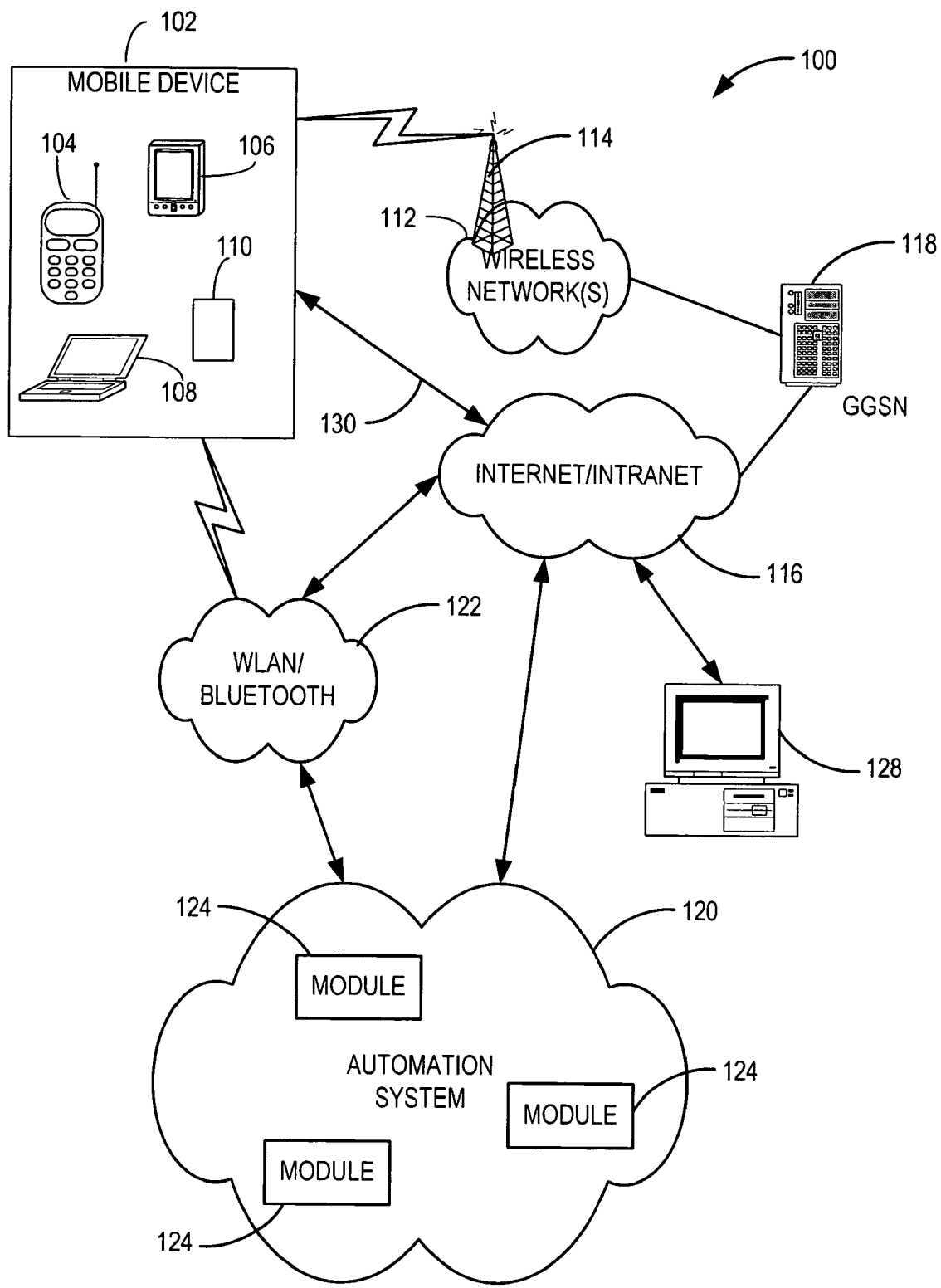
FIG. 1 is a system diagram showing various control elements of an automation system according to embodiments of the present invention.

The automation systems described herein may be used in connection with networked computing systems and mobile data processing devices. Today's communication and networking technologies have allowed integration of an ever-increasing variety of mobile devices into the landline and wireless networks spanning the globe. In addition to traditional voice communication, mobile devices can communicate data, images, audio/video, and other information over wireless networks, which can be coupled to communicate with landline networks. FIG. 1 is a block diagram illustrating a representative environment in 100 which the principles of the present invention may be applied.

In general, the environment 100 provides various manners of controlling an automation system 120. The automation system 120 may include any combination of automation apparatus known in the art. The illustrated embodiment includes a plurality of automation modules 124. In general, the automation modules 124 include generic interfaces that allow any module 124 to communicate with another module 124 without significant configuration or the use of a centralized controller. The modules 124 may independently perform any combination of functions such as control, sensing, measuring some physical property and/or external communications.

Although control of the modules 124 of the automation system 120 may be provided entirely within the system 120, it may be advantageous to allow external control of the system 120. In one example, functionality for controlling the system 120 may be associated with a mobile/wireless device 102. The control functionality may be contained in any number of mobile communication devices 102, such as a mobile/cellular phone 104, a personal digital assistant (PDA) 106, a notebook or laptop computer 108, or any other type of mobile terminal represented by device 110.

The mobile device 102 may communicate with one or more mobile operator networks 112. These mobile networks 112 may include, for example, a Global System for Mobile Communications (GSM) network and any associated networks such as a General Packet Radio System (GPRS) mobile communications network. As is known in the art, GPRS is a packet-switched service for GSM that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. These mobile networks 112 represent other wireless networks and access technologies as well, such as Universal Mobile Telecommunications System (UMTS), Personal Communications Services (PCS), messaging technologies such as Short Messaging Service (SMS), Enhanced Messaging Service (EMS), and Multimedia Messaging Service (MMS), and the like.

In the illustrated embodiment, the mobile device 102 is associated with a cellular network such as a GSM network, where the mobile device 102 communicates wirelessly with the mobile networks 112 via a base station 114. The mobile devices 102 may be used for communicating with one or more landline networks 116, which may include global area networks (GANs) such as the Internet. For example, the mobile networks 112 may communicate with landline networks 116 by way of Gateway GPRS Support Nodes (GGSN) 118, which serve as gateways between the GSM/GPRS network 112 and a packet switched public data network which may be connected to the landline network 116. Network elements of the automation system 120 may be accessible to the mobile device 102 by way of the mobile and landline networks 112, 116.

It will be appreciated that some mobile devices 102 may include the ability to directly connect to the landline networks 116 via direct wired connections 130 using technologies such as Ethernet, IEEE 1394, Universal Serial Bus (USB), modems, etc. The mobile devices may also include alternate wireless communications abilities, such as the capability to connect to wireless Local Area Networks (LANs) 122. Wireless networks use technologies such as IEEE 802.11 or Bluetooth to provide direct access to landline networks 116 and/or to the automation system 120. In addition, fixed computing systems such as the workstation 128, may also be used to externally control aspects of the automation system 120 via the networks 116, 122.

Automation systems in home and consumer environments have not gained wide acceptance beyond simple timing or sensing devices. It can be a daunting task for consumers to interconnect various electronic control components to perform even relatively simple tasks. On the other hand, using a professional to make such an interconnection can easily become too expensive. Therefore, an automation environment according to embodiments of the present invention includes independently operable modules that can be easily interconnected to perform automation functions. The modules can be selected with particular independent functions and can be assembled into more complex automation devices. These automation devices perform automation functions by coordinating the various functions of the modules that make up the devices.

Figure 2:
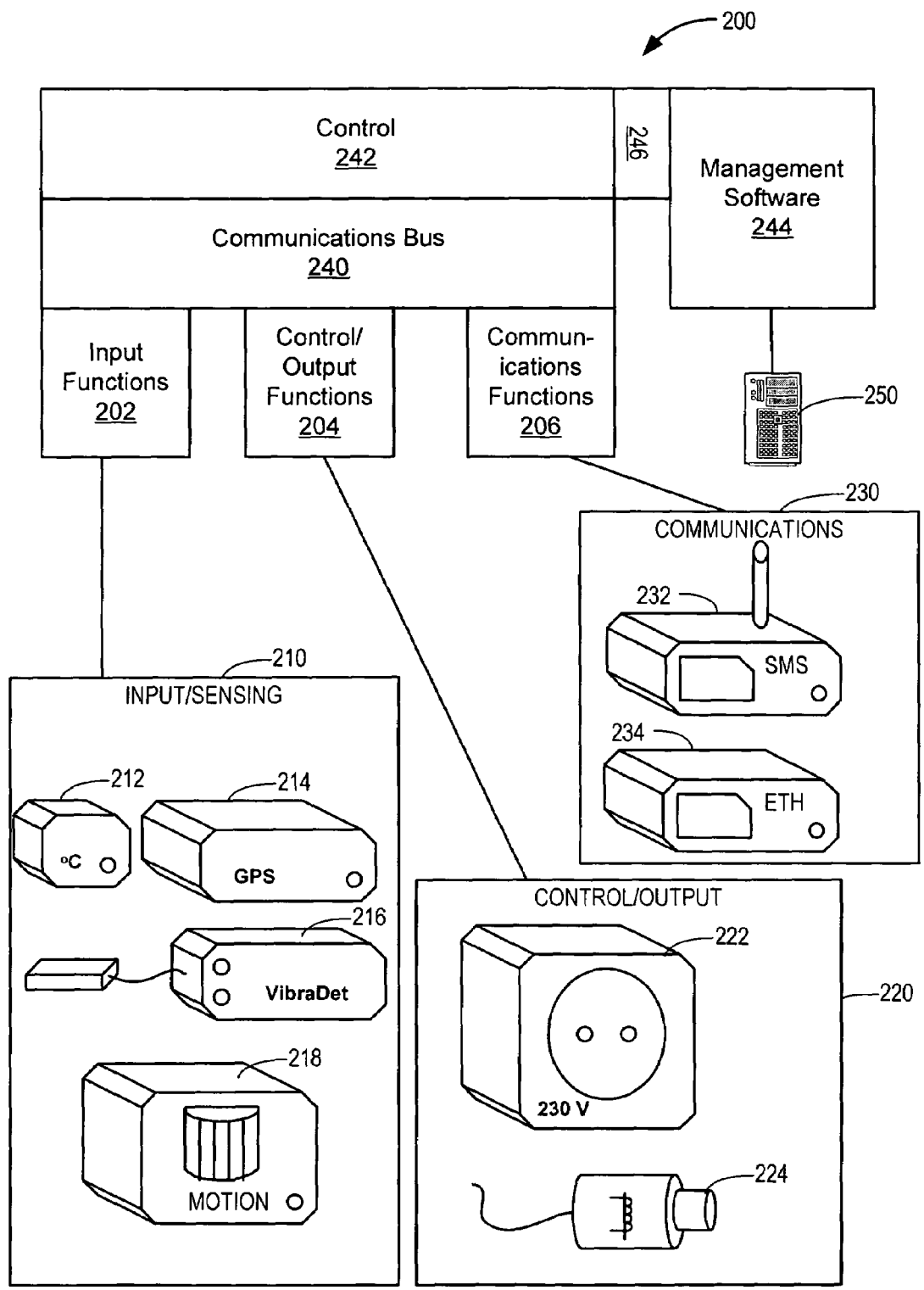
FIG. 2 is a system architecture diagram of an automation system according to embodiments of the present invention.

In reference now to FIG. 2, an automation architecture 200 is illustrated in accordance with embodiments of the present invention. The architecture 200 is configured to allow flexible interconnection between various generic modules. For purposes of illustration, the modules are divided into three basic categories of automation tasks: input functions 202, output/control functions 204, and external communications functions 206. The input functions 202 are generally provided by input modules 210 with transducers for converting physical occurrences into machine readable form. Examples of input modules 210 are shown, including a temperature sensor 212, Global Positioning Satellite (GPS) location sensor 214, sound/vibration sensor 216 and a motion detector 218. It will be appreciated that many other input modules 210 may be used as input devices 202, including sensors for video, moisture, humidity, biometrics, proximity, light, position, electromagnetism, radio frequency identification (RFID) tags, etc.

Besides detecting transducer signals, the input modules 210 may perform special conversions of the data. For example, the sound sensor 216 may be used to convert electrical signals from a microphone into digital form, such as a Pulse Code Modulation (PCM) data stream. In another example, the sound sensor 216 may be configured with voice recognition software, so that the sensor 216 outputs text that has been translated from speech detected by the microphone. Therefore, the input modules 210 may be classified by both the types of transducers used and by the types of data provided by the modules 210.

A typical application in an automation system is to automatically control an electrical or mechanical device. In the illustrated architecture, this can be handled by devices that perform a control/output function 204. Example control/output modules 220 that handle control/output functions 204 include a power switch 222 and a solenoid 224. Other modules 220 that may provide control/output functions 204 that include sounds, alarms, video displays, indicator lights, stepper motors, linear motion actuators, valves, power regulators, hydraulic/pneumatic controllers, radio transmitters, etc.

The external communications functions 206 can be used to enable external communications with the automation architecture 200. Communications modules 230 that provide this function 206 may include wireless transceivers 232 and wired network adapters 234. The wireless transceiver 232 may be adapted to any manner of wireless communication technologies, including 802.11 Wireless Local Area Network (WLAN), Bluetooth, cellular phone networks, analog radio, etc. Other communications modules 230 may provide communication functions 206 using any combination of modems, infrared transceivers, powerline network adapters, etc.

The input, output, and communications modules 210, 220, 230 are designed to be combinable, interoperable, and interchangeable. The modules 210, 220, 230 communicate through an internal communications bus 240. The communications bus 240 includes the physical and electronic connectivity, as well as other particulars such as timing, data formats, data protocols and system states. A control functionality 242 may be used to coordinate the tasks performed by the modules 210, 220, 230. The control functionality 242 may be encapsulated, in whole or in part, within the functional modules 210, 220, 230. The control functionality 242 may also include various data interfaces of the modules 210, 220, 230 that allow external control of the modules 210, 220, 230 via the communications bus 240.

The modules 210, 220, 230 may include self-contained control functionality 242 that allows the devices to autonomously and independently effectuate control operations. These control operations may be configured via management software 244. The management software 244 may provide the ability to initially configure the modules 210, 220, 230 for operation, as well as providing access to the modules 210, 220, 230 for direct control and monitoring.

For example, a user may purchase and assemble a temperature module 212 with a switching module 222. The modules 212, 222 already contain the capability to intercommunicate via a communications bus 240. The only task required of the user is to set one or more temperature parameters of the temperature module 212 and inform the switching module 222 to switch on or off based on the parameter(s). Typically, one or more of the modules 212, 222 contain a data interface 246 that allows a computer to access the control functionality 242 of the modules 212, 222.

The data interface 246 may operate using any manner of data communications known in the art, including USB, Ethernet, IEEE-1394 (Firewire), serial, parallel, WLAN, powerline networking, etc. The data interface 246 may be supplied by an additional communications module 230, or may be built into one or more of the modules 210, 220, 230 used to build the automation device. The management software 244 can access the control functionality of 242 the modules 210, 220, 230 so that the user can easily set module interactions.

The management software 244 may interact with executable instructions that operate within the modules 210, 220, 230, so that once the interactions are set, the modules continue to operate on instructions stored in memory of one or more of the modules 210, 220, 230. In other configurations, the modules 210, 220, 230 may actively respond to management software 242 running on a controller 250. The controller 250 may be a general purpose computer, or may be a logic unit dedicated for controlling the modules 210, 220, 230. Besides performing configuration and control logic functions, the controller 250 may also provide monitoring functions (e.g., system "heartbeat"), security management (e.g., setting encryption and access passwords), and provide "off-the-shelf" control setups for various combinations of modules 210, 220, 230.

Figure 3:
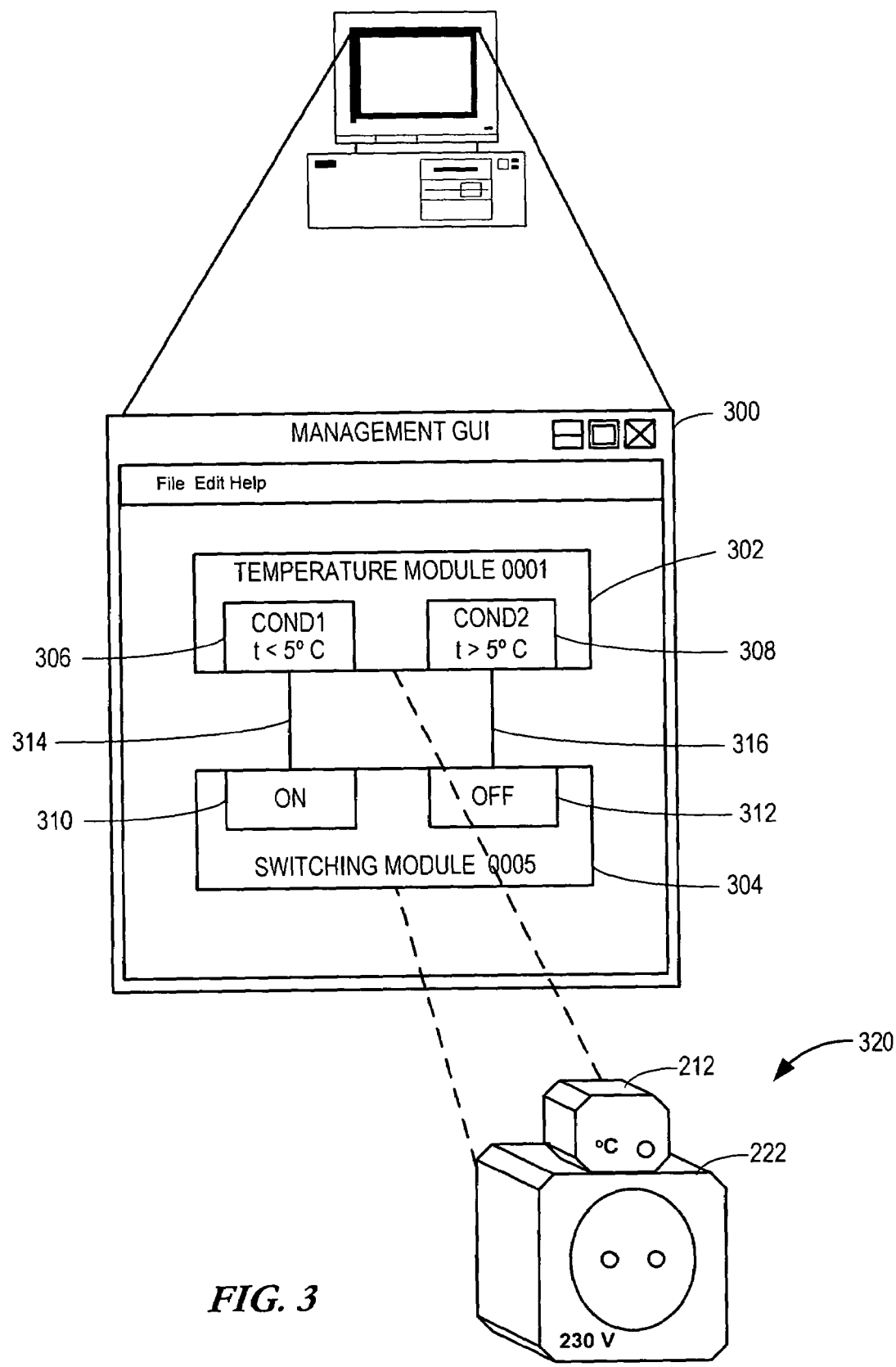
FIG. 3 illustrates a management software graphical user interface according to embodiments of the present invention.

Whether the management software 244 is used for initial configuration and/or active device control, the management software 244 is intended to provide user access to the functionality of the system modules 210, 220, 230. To that end, the management software 244 may present a Graphical User Interface (GUI) on a computer display that allows easy user configuration of automation modules. An example GUI 300 is shown in FIG. 3 according to embodiments of the present invention. The GUI includes components 302 and 304 that represent the temperature and switching modules 212, 222, respectively, of the previous example. The modules 212, 222 have been physically and data coupled to form an automation control device 320.

The GUI 300 presents the representative components 302, 304 as graphical elements, (e.g., boxes). Within the components 302, 304 are features that illustrate available interfaces of the respective devices 212, 222. For example, the temperature component 302 includes boxes 306, 308 that represent outputs available from the temperature module 212. The boxes 306, 308 may represent any type of available data function of the device, such as a temperature query function, a function to broadcast measured temperature at specified time intervals, or a function that responds to the existence of certain conditions. In the illustrated example, the boxes 306, 308 represent user definable condition functions. As shown, the temperature component 302 has been configured with conditions 306, 308 that correspond to the measured temperature being below and above 5° C., respectively. It is assumed the user can manually edit these conditions 306, 308, as well as adding more conditions and data access functions that can be associated with other automation scenarios.

The switching component 304 is a control/output module, therefore may include at least two control functions 310, 312, ON and OFF, respectively. The user can associate the control functions 310, 312 with the conditional functions 306, 308 to create a desired behavior of the assembled device. The user can coordinate these functions in the GUI 300 by creating graphical elements (e.g., lines) 314, 316 that link various component interfaces. In this example, the condition that the temperature is below 5° C. results (314) in the switch being turned on, and the condition that the temperature is above 5° C. results (316) in the switch being turned off. This behavior may be appropriate, for example, to control a space heater.

Although the example of the easily assembled temperature control device 320 shown in FIG. 3 is relatively simple, it will be appreciated that the generic and expandable nature of the modules allows the users to incrementally build flexible and sophisticated systems. In this example, the user may add to the device 320 a second switch module 212 or motor control module to turn on a fan and/or open a vent when the temperature is hot. This additional module can be coupled to the other modules and configured accordingly using the GUI 300. Similarly, the user can add a communications module such as the wireless module 232 shown in FIG. 2. This wireless module 232 may be configured to send and receive Short Messaging Service (SMS) messages via cellular phone networks. This provides the ability to remotely monitor the temperature module 212 by coordinating a message function of the wireless module 232 with a query function of the temperature module 212. Similarly, a message function of the wireless module 232 could be coordinated with the control functions 310, 312 of the switch module 222 to send ON/OFF commands via a mobile telecommunications device.

Figure 4:
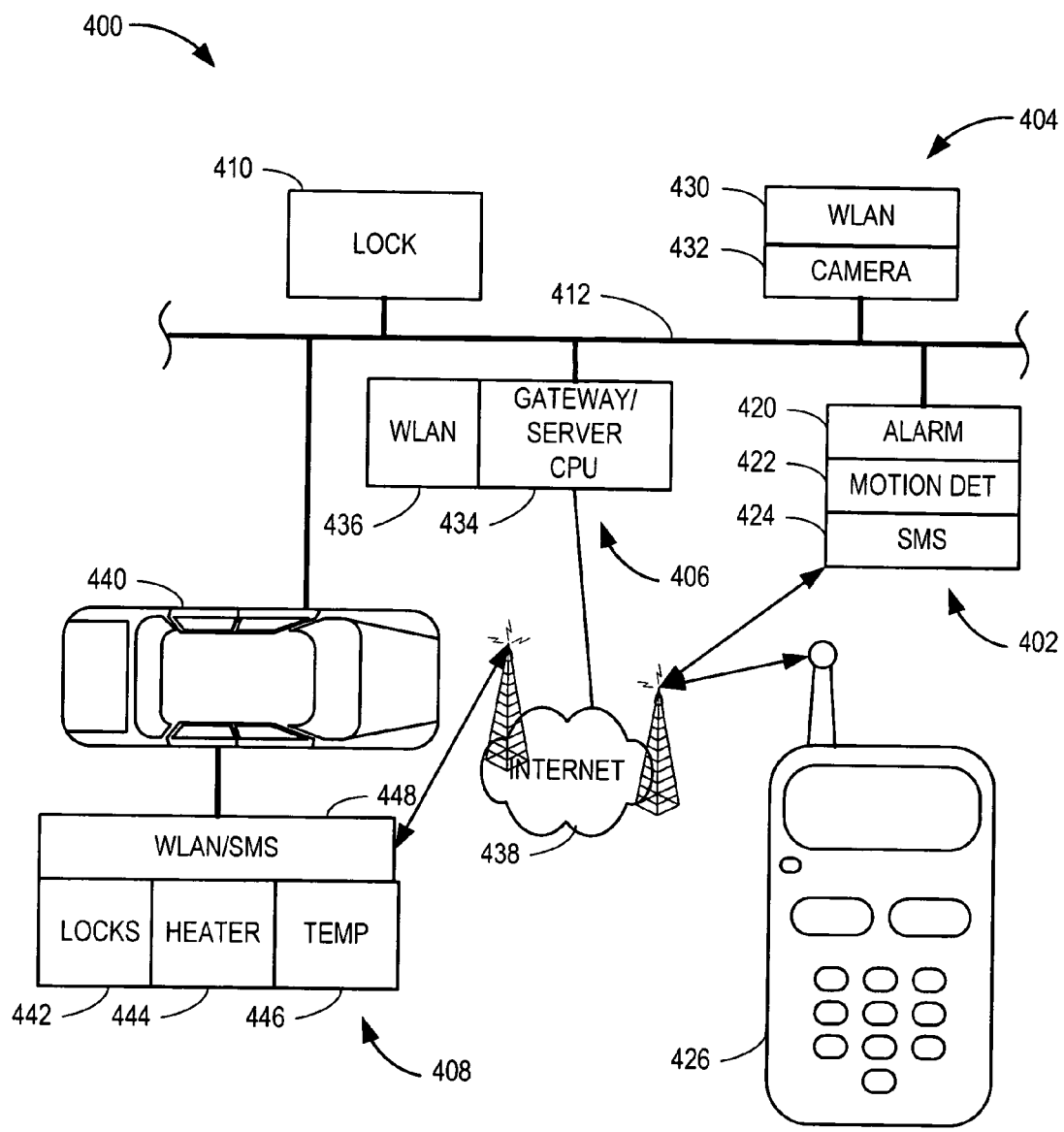
FIG. 4 illustrates an automated system according to embodiments of the present invention.

A more sophisticated automation system 400 according to embodiments of the present invention is illustrated in FIG. 4. The system 400 includes various automation devices formed using modular components. The modules have capabilities to inter-operate within the devices, and may be configured to operate with modules of other devices. The devices used in the illustrated system 400 include an alarm 402, a network camera 404, a gateway/server 406, and an automotive control assembly 408. In addition, a standalone door lock module 410 is employed.

The modules that form the assembled devices 402, 404, 406, 408 are coupled within the device via a communication bus (e.g., bus 240 in FIG. 2) suitable for inter-module communications. This bus may include both physical and electrical interfaces that are connected when the modules are assembled. In addition, the inter-module communication bus can be extended to operate across a system bus 412. The system bus 412 may be a wired or wireless communication channel, and may use a custom protocol or ride atop an existing protocol. For example, since the modules can usually utilize AC power, the system bus 412 can be designed to operate using power-line networking. Extending the module communication bus 240 to the system bus 412 can provide highly flexible automation arrangements.

The assembled devices 402, 404, 406, 408 are formed by connecting two or more modules together. The alarm device 402 includes an alarm output module 420 (e.g., speaker and flashing light) coupled to a motion detector module 422 and an SMS communications module 424. The alarm 402, therefore, may have the ability to detect intrusions via the motion detector 422 and respond using the alarm output module 420 and by sending an SMS message to a mobile terminal 426 via the SMS module 424.

Another device in use by the system 400 is the network camera 404, formed by assembling a camera module 430 to a WLAN communications module 432. The network camera 404 could be used as a Web camera for monitoring children or pets. The output of the network camera 404 could be sent to external networks via a gateway/server 406. The gateway/server 406 includes a CPU portion 434 and a WLAN communications module 436. The gateway/server 406 may be formed of modular components, or may be a standard general-purpose computing device (e.g., desktop computer). If the gateway/server 406 is a general purpose computer, it may include an adapter (not shown) to communicate over the system communication bus 412 for configuration of the devices 402, 404, 406, 408 using management software (e.g., software 244 in FIG. 2). Further, the gateway/server 406 can provide connectivity to the Internet 438 and/or other external networks.

The network camera 404 and gateway/server 406 are formed of modules/components that are interoperable with modules of the alarm 402, therefore the network camera 404 and gateway/server 406 may also be configured to respond to alarm events. The network camera 404 may be turned on and/or aimed if the alarm 402 is activated, and the gateway/server 406 can send out an email or instant message to the user's Internet account(s). In another scenario, the network camera 404 may be aimed at the front door of a house, and the lock of the front door controlled by the lock module 410. A user could remotely allow an authorized person (e.g., repair person) into the house by viewing the camera output 404 and, if the person checks out, remotely actuating the lock module 410.

The automation concepts described herein can also be applied to vehicular electronics, such as devices used in a car 440. The automotive control device 408 can be assembled using interchangeable modules that communicate with each other as well as with the rest of the automation system 400. The example automotive control device 408 includes a heater control module 444, a lock control module 442, a temperature sensing module 446 and a wireless communications module 448 that can communicate via SMS and/or WLAN.

Figure 5:
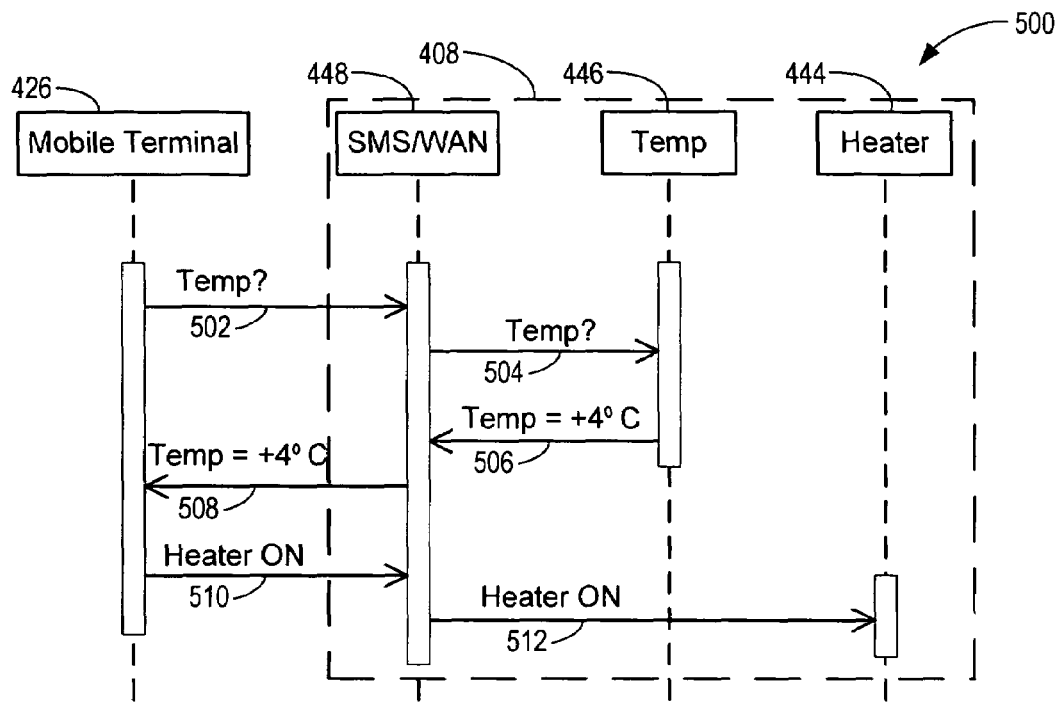
FIG. 5 is a sequence diagram showing a remotely controlled automation scenario according to embodiments of the present invention.

One example of system interactions according to embodiments of the present invention is illustrated in a sequence diagram 500 in FIG. 5. The sequence diagram 500 illustrates the use of a mobile terminal 426 to remotely control an automobile heater using the automotive control device 408 described in relation to FIG. 4. The user creates a query 502 at the mobile terminal 426 directed for the automotive control device 408. In this example, the query 502 is a temperature query sent using an SMS text message. It will be appreciated that any manner of communications may be adapted for use in this scenario, including email, Internet instant messaging, Web services, etc.

The query 502 is received at the SMS/WAN communications module 448. A forwarded query 504 can be sent to the temperature sensing module 446 via the module inter-communications bus. The temperature sensing module 446 creates a response 506 containing the current temperature in the vehicle, and this response 506 is used to form a response SMS message 508 sent from the SMS/WAN communications module 448 to the mobile terminal 426. This allows the user to make a determination that the heater should be turned on.

The user can send a heater ON command 510 using SMS to the SMS/WAN communications module 448. The SMS/WAN communications module 448 forwards 512 this command via the module inter-communications bus to the heater control module 444, which then turns the heater on. It will be appreciated that variations on this query-response-command scenario may be applied to many control devices in a vehicular or home automation system. Such scenarios can be used to control locks, lights, alarms, and other automation apparatus as described herein.

Figure 6:
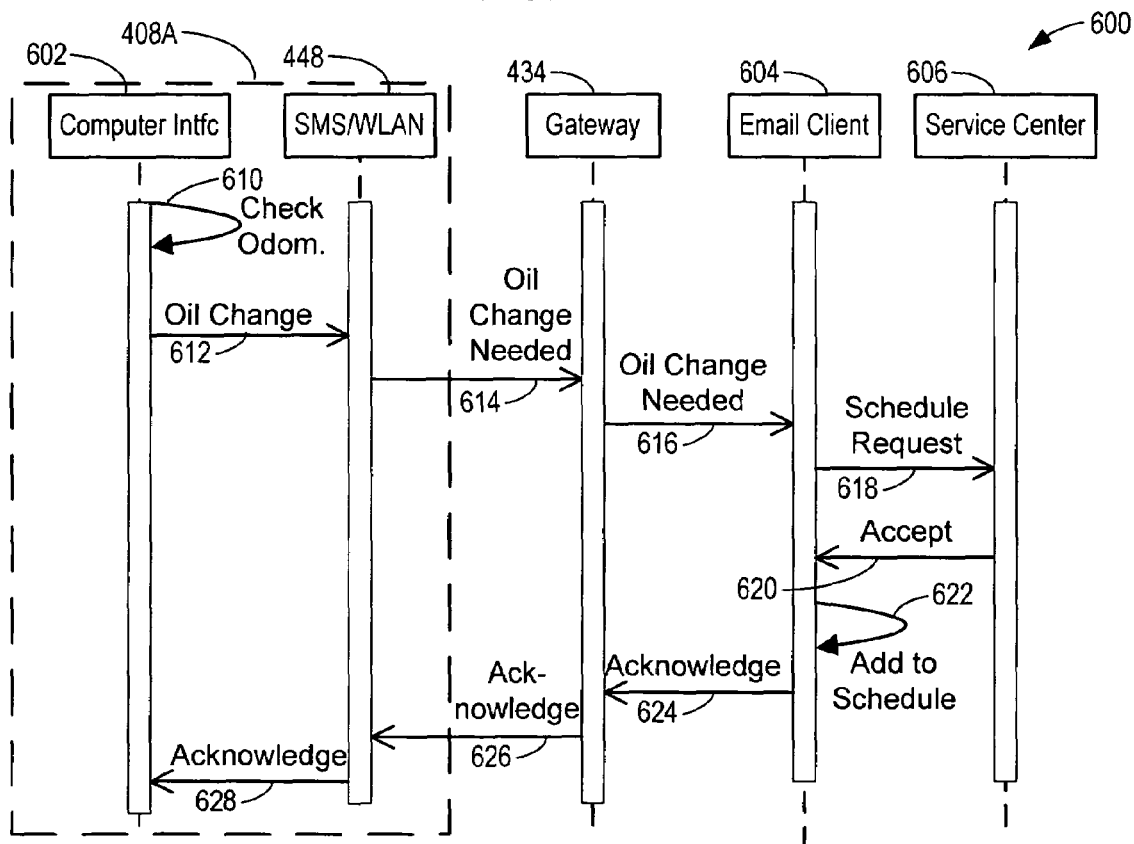
FIG. 6 is a sequence diagram showing an automatically triggered automation scenario according to embodiments of the present invention.

The automation systems described herein can be also be automatically triggered based on detected events, such events provided by motion detectors or temperature sensors. An automatically triggered scenario according to embodiments of the present invention is shown in the sequence diagram 600 of FIG. 6. This scenario 600 deals again with an automotive control device 408A. This device 408A includes the ability to interface to an automotive computer. Most modern automobiles employ computers for control, diagnosis, and maintenance. The automotive control device 408A may interface directly with this computer, such as via a special interface module 602. In this example, the automotive control device 408A is employed to check vehicle maintenance milestones and assist in scheduling maintenance.

Typically, maintenance such as oil changes are based on odometer readings, although more sophisticated maintenance computers factor in parameters such as engine running time, temperature conditions, engine load profiles, etc. The automotive control device 408A can query 610 one of these parameters (e.g., odometer readings) via the computer interface 602 to detect a maintenance milestone. When a milestone is reached, a maintenance request 612 (e.g., oil change request) is forwarded 614 to the SMS/WAN communications module 448. It is assumed the control device 408A can access the gateway 434, such as via a WLAN connection made while the vehicle is parked in the user's garage. Other manners of communications may be used, such as using a data connection over a cellular phone network.

The gateway 434 can format the received oil change request 614 into an appropriate message for transmission to the user through a common communication medium (e.g., Internet). In this example, the gateway 434 forms an email message 616 which is sent to an email client 604 accessible by the user. The gateway 434 could automatically include pre-determined information in the email message 616, such as a unique message identifier, the car's make, model, mileage, and the email address of a service center. The user can forward 618 the request to a service center 606 (or use other means such as a telephone call) to schedule an appointment. The service center 606 can accept 620 the appointment, and this can automatically be added 622 to the user's calendar. An acknowledgement 624 can be send via the gateway 434, which then forwards 626 the acknowledgement to the SMS/WAN communications module 448, which communicates an acknowledgement 628 to the appropriate module in the device 408A. This acknowledgement 628 can be used to reset the maintenance monitoring program.

Figure 7:
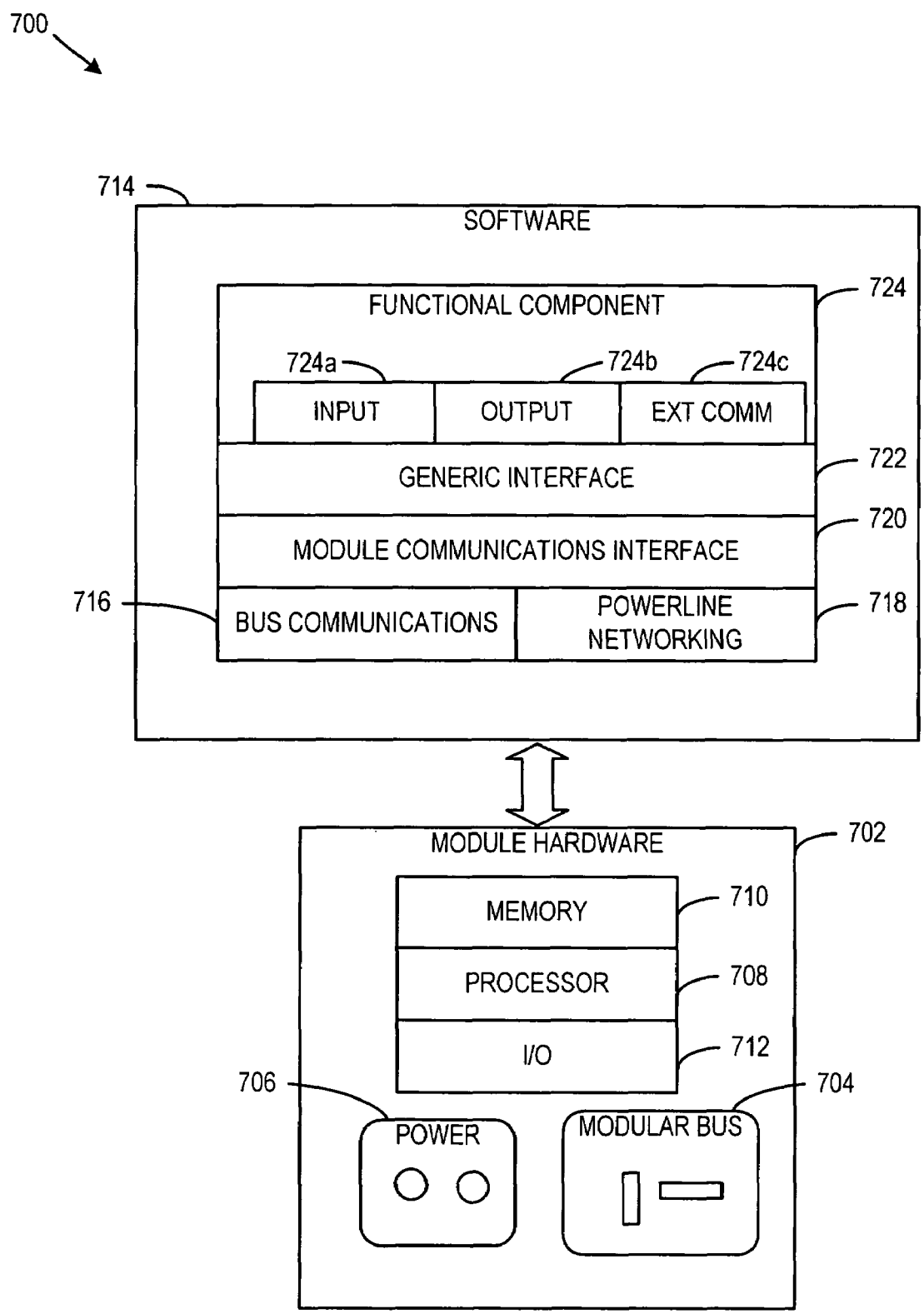
FIG. 7 is a hardware and software component diagram showing common automation module features according to embodiments of the present invention.

There are a large variety of specialized functions that can potentially be provided by automation modules. However, all automation modules will generally include common set of features that allow the modules to automatically interoperate with each other. In reference now to FIG. 7, a hardware and software architectural diagram 700 illustrates common features of a control module 702 according to embodiments of the present invention. The control module 702 includes a modular bus interface 704. The modular bus interface 704 may include electrical (e.g., data and power) and mechanical features that allow physically attaching modules 702 so that the modules 702 can exchange data.

The modules 702 may also include an external power interface 706. In an assembly of modules 702, some modules 702 may obtain power from another module 702 through the modular bus interface 704. However, at least one module 702 in an assembly may contain the capability to connect to external power, such as an AC outlet. Although only one module 702 in an assembly may require the capability to access external power, all modules 702 may still include a separate external power interface 706. The external power interface 706 may include, for example, a removable AC power plug portion. Any modules 702 that do not require interfacing to external power may have the external power interface 706 fitted with a blank cover, and the module 702 that interfaces with the AC outlet can have the AC power plug fitted to its external power interface 706.

The module 702 generally includes a processor 708 for performing programmable functions. The processor 708 may include a general purpose CPU (e.g., x86, PowerPC™, ARM) or may be a custom logic circuit for performing functions of the module 702. The processor 708 is coupled to a memory 710 for storing program instructions, dynamically generated data, state data, and the like. The memory 710 may be include read-write and read-only memory, and may be volatile or non-volatile. The processor 708 is also coupled to Input/Ouptut (I/O) circuitry 712 used for interfacing with other devices.

The module 702 will typically contain or more executable instructions in the memory 710. One arrangement of executable instructions partitioned by functionality is shown in the software diagram 714. At the lowest level in the diagram 714 are the basic communications software shown as bus communications 716 and powerline networking components 718. The bus communications component 716 handles low level inter-module communications functions, such as data transfer and tracking of communication states. The powerline networking component 718 can extend bus networking so that modules 702 can intercommunicate over AC power wires via the external power interface 706.

The bus communications 716 and powerline networking components 718 provide device driver level communications for the module 702. At a higher level of abstraction, a module communications interface 720 provides a uniform layer of instructions for handling all communications between modules 702 regardless of the underlying device. The module communications interface 720 may communicate via the lower layers 716, 718, and most modules 702 may communicate this way by default. The module communications interface 720 may also be adapted to communicate in ways that are unique for a particular module 702. For example, a WLAN external communications module (e.g., module 430 in FIG. 4) may provide TCP/IP communications via an 802.11 wireless network. The module communications interface 720 may be adapted to provide inter-module communications via TCP/IP, as well as through the bus communications module 716 and/or powerline networking module 718.

Since different modules 702 may perform different automation tasks such as input, output, and/or external communications, a generic interface 722 can be used to provide a minimum set of functions supported by all devices. Such generic functions may include setting time, built-in-test, providing module communication states, etc. Similarly, the generic interface 722 may provide a mechanism for extending the interface to communicate with any module 702. For example, technologies such as Jini® allow devices to discover and carry on ad hoc data exchanges using a standard, generic interface. Therefore the modules 702 may form custom interfaces using ad hoc extensions to the generic interface 722.

Each module 702 has a particular function that is provided by a functional component 724. The functional component 724 may include one or more sub-components that provide generic functions such as input 724a, output, 724b, and external communications 724c.

Input functional components 724a may include drivers to read data from an input device (e.g., thermocouple, camera, etc.) and provide the data in a usable format. The input functional component 724a may provide externally accessible functions such as supporting queries of the input data values and providing asynchronous reporting of input values. The output functional component 724b may be used to control devices (e.g., relays, switches, motors) and may provide external functions accessible by other modules 702 such as accepting control commands and providing state of the control device. The external communications module 724c provides the devices and protocol knowledge needed to communicate using a particular technology, and can provide data transfer functions to other modules 702.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art are readily able to combine software created as described with appropriate general purpose or special purpose computer hardware to create a sensor-based system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. An apparatus configured to control an automation function, comprising:
   two or more automation modules selected from a plurality of interchangeable automation modules and connectable into a single physical assembly, each automation module including,
   an enclosure including a physical interface that is capable of physically coupling with any others of the plurality of automation modules;
   a data interface that is capable of data coupling with any others of the plurality of automation modules to exchange data with any others of the plurality of automation modules;
   a processor coupled to the data interface; and
   a functional component operable by the processor for performing an independent automation task; and
   wherein the data interfaces of at least two of the two or more automation modules are coupled to exchange data communications for coordinating the respective functional components of the automation modules to perform the automation function.

2. The apparatus as in claim 1, wherein the data interfaces of the two or more automation modules are configured to transfer data via an electrical power interface.

3. The apparatus as in claim 1, wherein the data interfaces of the automation modules are accessible via a computing arrangement.

4. The apparatus as in claim 3, wherein the computing arrangement actively controls the automation function.

5. The apparatus as in claim 3, wherein the computing arrangement is configured to communicate a configuration to the apparatus for coordinating the functional components, and wherein the processors of the automation modules are configured to perform the automation function based on the configuration.

6. The apparatus as in claim 1, wherein the two or more automation modules include a wireless communications module.

7. The apparatus as in claim 6, wherein the wireless communications module includes a cellular communications module compatible with a cellular communications network.

8. The apparatus as in claim 7, wherein the cellular communications module is arranged to receive data from a mobile terminal to control at least one of the automation modules.

9. The apparatus as in claim 7, wherein the cellular communications module is arranged to send data to a mobile terminal to communicate data originating from at least one of the automation modules.

10. The apparatus as in claim 1, wherein the independent automation task comprises at least one of data input, control output, and external communications.

11. The apparatus as in claim 1, wherein the two or more automation modules further comprise a mechanical interface that allows additional automation modules to connect to the single physical assembly.

12. A method for performing an automatic control function, comprising:
   selecting first and second automation modules from a plurality of interchangeable automation modules, each of the plurality of automation modules configured for performing an independent function and capable of data coupling with any others of the plurality of automation modules to exchange data with any others of the plurality of automation modules;

connecting the first and second automation modules into a single physical assembly via physical interfaces of the first and second automation modules, wherein the physical interfaces are capable of physically coupling with any others of the plurality of automation modules;

coordinating the independent functions of the first and second automation modules by communicating data between the first and second automation modules; and performing the automatic control function based on the coordinated independent functions of the first and second automation modules.

13. The method of claim 12, further comprising communicating a control command from a mobile terminal to at least one of the automation modules.

14. The method of claim 12, further comprising communicating data originating from at least one of the automation modules to a mobile terminal.

15. The method of claim 12, wherein coordinating the independent functions of the first and second automation modules further includes communicating from a computing arrangement to the automation modules a configuration for coordinating the independent functions of the first and second automation modules.

16. The method of claim 12, wherein performing the automatic control function includes communicating commands from a computing arrangement to the automation modules to coordinate the functions of the first and second automation modules.

17. The method of claim 12, wherein the independent functions of the first and second automation modules comprise at least one of data input, control output, and external communications.

18. A system for controlling an automation function, the system comprising:

two or more control devices each comprising one or more automation modules selected from a plurality of interchangeable automation modules, wherein at least one of the control devices comprises two or more of the automation modules capable of being coupled into a single physical assembly, wherein each of the automation modules includes,
an enclosure including a physical interface that is capable of physically coupling with any others of the plurality of automation modules;
a data interface that is capable of data coupling with any others of the plurality of automation modules and exchanging data with any other automation modules of the plurality of automation modules;
a processor coupled to the data interface;
a functional component operable by the processor for performing an independent automation task; and wherein the data interfaces of the plurality of automation modules are coupled to exchange data communications for coordinating the respective functional components of the automation modules to perform a function of the control device; and wherein the control devices are configured to communicate with each other via the data interfaces of at least one of the automation modules of the respective control devices to coordinate the functions of the respective control devices to perform the automation function.

19. The system as in claim 18, wherein the data interfaces of the automation modules are configured to transfer data via an electrical power interface.

20. The system as in claim 18, further comprising a computing arrangement coupled to communicate with the automation modules.

21. The system as in claim 20, wherein the computing arrangement actively controls the automation function.

22. The system as in claim 20, wherein the computing arrangement is configured to communicate a configuration to the control devices to coordinate the functions of the control devices, and wherein the processors of the automation modules are configured to perform the functions of the control devices based on the configuration.

23. The system as in claim 18, wherein the automation modules include a wireless communications module.

24. The system as in claim 23, wherein the wireless communications module includes a cellular communications module compatible with a cellular communications network.

25. The system as in claim 24, further comprising a mobile terminal arranged to communicate data with the cellular communications module.

26. The system as in claim 18, wherein the independent automation task comprises at least one of data input, control output, and external communications.

27. An automation module operable with other a plurality of other automation modules for performing an automation function, comprising:

means for physically coupling with any of the plurality of other automation modules to form a single physical assembly;

means for data coupling with any of the plurality of other automation modules to exchange data with any others of the plurality of automation modules;

means for performing an independent automation task; and means for exchanging data with other automation modules of the assembly to coordinate the independent automation task with one or more independent automation tasks of the other automation modules to perform the automation function.

* * * * *